US012686262B2

(12) United States Patent
Akif et al.

(10) Patent No.: US 12,686,262 B2
(45) Date of Patent: Jul. 21, 2026

(54) VENTILATION FLAP FOR A VEHICLE

(71) Applicant: Bayerische Motoren Werke Aktiengesellschaft, Munich (DE)

(72) Inventors: Oeztzan Akif, Munich (DE); Christian Hack, Schweitenkirchen (DE); Arne Koehler, Pliening (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 933 days.

(21) Appl. No.: 17/915,337

(22) PCT Filed: May 27, 2021

(86) PCT No.: PCT/EP2021/064299
§ 371 (c)(1),
(2) Date: Feb. 15, 2023

(87) PCT Pub. No.: WO2021/239923
PCT Pub. Date: Dec. 2, 2021

(65) Prior Publication Data
US 2025/0340108 A1 Nov. 6, 2025

(30) Foreign Application Priority Data
May 28, 2020 (DE) ..................... 10 2020 114 359.1

(51) Int. Cl.
*B60K 11/08* (2006.01)
*F16K 1/20* (2006.01)
(52) U.S. Cl.
CPC .......... *B60K 11/085* (2013.01); *F16K 1/2014* (2013.01)

(58) Field of Classification Search
CPC . B60K 110/85; F16K 1/20; F16K 1/18; F16K 1/2014
See application file for complete search history.

(56) References Cited

U.S. PATENT DOCUMENTS

| | | | | | |
|---|---|---|---|---|---|
| 2018/0347706 | A1* | 12/2018 | Ishikawa | ............... | F16K 1/2028 |
| 2021/0023937 | A1* | 1/2021 | Gerber | ................ | B60K 11/085 |

FOREIGN PATENT DOCUMENTS

| | | |
|---|---|---|
| DE | 10 2014 226 027 A1 | 6/2016 |
| DE | 10 2014 226 028 A1 | 6/2016 |

(Continued)

OTHER PUBLICATIONS

Translation DE102014226027A (Year: 2025).*

(Continued)

*Primary Examiner* — Kelsey E Cary
(74) *Attorney, Agent, or Firm* — Crowell & Moring LLP

(57) ABSTRACT

A ventilation flap is provided for a ventilation flap assembly of a vehicle front. The ventilation flap blocks an air inlet of the vehicle front in a closed position and allows the air inlet in an open position. The ventilation flap can be rotated from the closed position into the open position by way of a rotational movement about a rotational axis by an actuator which can be connected to the rotational axis. The ventilation flap is divided into two adjoining regions in the vehicle vertical direction. A first upper region of the two regions in the vehicle vertical direction extends substantially in the vehicle vertical direction, and a second lower region of the two regions in the vehicle vertical direction extends rearwards in the vehicle longitudinal direction and downwards in the vehicle vertical direction from the first region.

11 Claims, 1 Drawing Sheet

(56)                    References Cited

FOREIGN PATENT DOCUMENTS

| | | | |
|---|---|---|---|
| DE | 10 2015 221 003 A1 | 4/2017 | |
| DE | 10 2016 224 846 A1 | 6/2018 | |
| EP | 2 335 963 A1 | 6/2011 | |
| FR | 3 076 772 A1 | 7/2019 | |
| KR | 10-2016-0057632 A | 5/2016 | |
| WO | WO-2007139407 A1 * | 12/2007 | ............. F16K 15/03 |

OTHER PUBLICATIONS

German-language Search Report issued in German Application No. 10 2020 114 359.1 dated Feb. 23, 2023 with partial English translation (12 pages).
German-language Office Action issued in German Application No. 10 2020 114 359.1 dated Feb. 23, 2023 (seven (7) pages).
International Search Report (PCT/ISA/210) issued in PCT Application No. PCT/EP2021/064299 dated Aug. 23, 2021 with English translation (five (5) pages).
German-language Written Opinion (PCT/ISA/237) issued in PCT Application No. PCT/EP2021/064299 dated Aug. 23, 2021 (five (5) pages).

* cited by examiner

VENTILATION FLAP FOR A VEHICLE

BACKGROUND AND SUMMARY

The present invention relates to a ventilation flap for a ventilation flap arrangement of a vehicle front, a vehicle front having the ventilation flap, and a vehicle having the vehicle front.

Ventilation flaps and ventilation flap arrangements are generally known from the prior art.

Thus, DE 10 2016 224 846 A1 discloses, for example, a ventilation flap system for the control of the introduction of air into a motor vehicle. The ventilation flap system comprises an actuator, at least one group of ventilation flaps, each of which is arranged so as to be able to be pivoted between an open position and a closed position, is acted on by means of a spring in a first rotation direction and can be pivoted by the actuator counter to the action of a spring in a second rotation direction opposite the first rotation direction.

In this case, in principle, two systems of ventilation flaps are intended to be distinguished. In one system, a ventilation flap which can be rotated substantially about a vehicle width direction is provided in order to completely close an air inlet for an engine compartment at the vehicle front in the vertical vehicle direction.

In the other systems, a ventilation flap which is rotatably supported substantially about a vehicle width direction is provided in order to be moved from a closed position into an open position.

The present invention relates to the first systems. In this instance, such a ventilation flap has at least two positions. In a closed position, it blocks an air inlet for an engine compartment at the vehicle front and in an open position it releases the air inlet. The ventilation flap can be rotated, by a rotational movement about a rotational axis by means of an actuator which can be connected to the rotational axis, from the closed position into the open position.

In the closed position of the ventilation flap, air which flows against the vehicle front during travel thus does not flow into an engine compartment which is located in a longitudinal vehicle direction behind the vehicle front.

A drag coefficient of the vehicle is thereby reduced in comparison with an open position in which the incoming air is directed into the engine compartment in order to cool an engine.

As a result of an arrangement of the ventilation flap with the shortest possible distance relative to the foremost location of the vehicle front, the reduction of the drag coefficient can be further maximized. In this arrangement, the incoming air during travel operation flows over the vehicle.

In an arrangement which, in the longitudinal vehicle direction, is further away from the foremost location of the vehicle front, an impact location is produced. The term "impact location" is intended to be understood to be a location on a surface of a member which is subjected to flow and at which the flowing air theoretically strikes in a perpendicular manner. The speed of the air disappears at the impact location so that the kinetic energy is converted into pressure energy. This results in an increase of the drag coefficient.

The objective is to reduce the drag coefficient and therefore to arrange the ventilation flap in the closed position as close as possible to the foremost location of the vehicle front, wherein it must be ensured that the ventilation flap can be moved by means of the rotational movement from the closed position into the open position.

It is problematic in this instance that regular additional components such as, for example, a grille, are arranged between the foremost location of the vehicle front and the ventilation flap. As a result of the rotational movement and predetermined geometry of the ventilation flap, therefore, a specific minimum distance must be maintained with respect to the additional components, in particular the grille, in order to prevent a collision of the ventilation flap with the additional components during the rotational movement.

An object of the invention is therefore to provide a system which, inter alia, is configured to overcome these disadvantages from the prior art, in particular to provide a ventilation flap which enables an arrangement with the minimum possible spacing with respect to the foremost location of the vehicle front.

This object is achieved according to the invention by the features of the independent claims. The dependent claims relate to advantageous embodiments.

Accordingly, the object is achieved by a ventilation flap for a ventilation flap arrangement of a vehicle front. The ventilation flap blocks an air inlet of the vehicle front in a closed position and releases the air inlet in an open position. The ventilation flap can be rotated from the closed position into the open position by a rotational movement about a rotational axis by means of an actuator which can be connected to the rotational axis.

The ventilation flap is characterized in that the ventilation flap is divided in the vertical vehicle direction into two mutually adjacent regions. A first upper region of the two regions in the vertical vehicle direction extends substantially in the vertical vehicle direction and a second lower region of the two regions in the vertical vehicle direction extends from the first region in the longitudinal vehicle direction toward the rear and in the vertical vehicle direction in a downward direction.

During travel operation, only an overflow of the air in the upper portion of the ventilation flap arrangement is possible. In the lower portion of the ventilation flap arrangement, an impact location is also formed with the arrangement with a shortest possible distance with respect to the foremost location of the vehicle front in the longitudinal vehicle direction. It is thereby possible without any or with only a very small impairment of the drag coefficient to position the ventilation flaps in the lower portion of the ventilation flap arrangement further away from the foremost location of the vehicle front than the ventilation flaps in the upper portion of the ventilation flap arrangement.

In order to prevent contact of the ventilation flap with another component of the vehicle front, in particular a grille, during the rotational movement of the ventilation flap, the ventilation flap in the vertical vehicle direction is divided into two mutually adjacent regions. In this case, a first upper region of the two regions in the vertical vehicle direction extends substantially in the vertical vehicle direction and consequently substantially parallel with the grille. During the rotational movement, this region turns away from a front side of the vehicle front in the longitudinal vehicle direction toward the rear and does not collide therewith. The upper region of the ventilation flap can therefore, in order to enable the air to flow over in the closed state, be positioned with the shortest possible spacing with respect to the foremost location of the vehicle front.

The second lower region of the two regions in the vertical vehicle direction extends from the first region in the longitudinal vehicle direction toward the rear and in the vertical vehicle direction in a downward direction so that this region (or each location of this region) can carry out a rotational movement with a smaller rotation radius starting from the rotational axis than the first region and consequently also a collision of the lower region with the grille is prevented.

The drag coefficient sensitivity relates in this instance mainly to an upper air region of the ventilation flap, wherein this region is closed by the ventilation flap far to the front, whilst the lower region of the ventilation flap has a lower sensitivity with respect to the drag coefficient. The lower region, in particular in comparison with the upper region, can thereby be located further to the rear in the longitudinal vehicle direction. The flap rotational axis, in comparison with conventional systems, can thereby be displaced further forward in the longitudinal vehicle direction. It is therefore further particularly advantageous that the actuator which moves the ventilation flap as a result of its position located further forward in the longitudinal vehicle direction, in the event of a low-speed crash, is not pressed into the radiator.

The actuator which can rotate the ventilation flap from the closed position into the open position by means of the rotational movement about the rotational axis may include an electric motor, in particular a servo motor.

The fact that the actuator can be connected to the rotational axis does not mean that the actuator necessarily has to engage, in particular directly, on the rotational axis or to be connected thereto.

It is, for example, also contemplated for the actuator to produce the rotational movement by means of a slotted guiding member in a side face of the ventilation flap.

The actuator may be arranged in the longitudinal vehicle direction in front of and/or in the vertical vehicle direction above the rotational axis. However, the rotational axis determines a movement path of a front side of the ventilation flap which has the two regions.

The term "substantially in the vertical vehicle direction" may in this instance mean that the first region extends primarily in the vertical vehicle direction. As a result of production tolerances or a form of the vehicle front, however, it may be necessary for the first region to extend in a slightly inclined manner with respect to the vertical vehicle direction in order, for example, to extend parallel with a component which is arranged in the longitudinal vehicle direction in front of the ventilation flap, such as the grille. However, the first region may also actually extend parallel with the vertical vehicle direction or extend therein.

The air inlet may in particular be an upper air inlet on the vehicle front. It is contemplated for the air inlet to be arranged between a retention member for a registration plate and a hood of the vehicle.

A lowest location of the first region of the ventilation flap in the vertical vehicle direction may be located at the same height in the vertical vehicle direction as the rotational axis so that the first region and a horizontal which extends through the rotational axis parallel with the longitudinal vehicle direction substantially define a right angle.

This means that the upper region forms a tangent on the rotation radius or on the described circle and this tangent can define a right angle with a straight line which extends through the rotational axis and a contact point of the tangent with the rotation radius.

The second region may extend from the first region in a curved manner toward the rear in the longitudinal vehicle direction and in a downward direction in the vertical vehicle direction.

It is particularly contemplated for the second region to extend from the first region at least partially, in particular completely, in a curved manner in the longitudinal vehicle direction toward the rear and in the vertical vehicle direction in a downward direction with a radius of curvature which corresponds to a spacing of the lowest location of the first region from the rotational axis.

This spacing of the lowest location of the first region from the rotational axis corresponds to the radius of the described circle or a movement path of the second region about the rotational axis. Each location of the second region which moves on this movement path consequently during the rotational movement from the closed position into the open position in the longitudinal vehicle direction does not exceed the position which the lowest location of the first region has in the closed position in the longitudinal vehicle direction. A collision of the second region with a grille or another component of the vehicle front which is arranged in the longitudinal vehicle direction in front of the ventilation flap is consequently excluded.

The rotational axis may extend substantially in the vehicle width direction. The term "substantially in the vehicle width direction" may in this instance mean that the rotational axis extends primarily in the vehicle width direction. As a result of production tolerances or a shape of the vehicle front, however, it may be necessary for the rotational axis to extend in a slightly inclined manner with respect to the vehicle width direction in order, for example, to extend parallel with a component which is arranged in the longitudinal vehicle direction in front of the ventilation flap, such as the grille. However, the rotational axis may also actually extend parallel with the vehicle width direction or extend therein.

In order to move the ventilation flap from the closed position into the open position, the rotational movement may involve a rotation of the ventilation flap about the rotational axis, which extends in the vehicle width direction, in the vertical vehicle direction in an upward direction.

In other words, the ventilation flap may be rotated away upward in the direction of a hood in order to release the air inlet.

In the closed position, the second region of the ventilation flap may be in contact with an air guiding face of the vehicle front which is arranged in the vertical vehicle direction below the ventilation flap in order to thus block the air inlet.

This means that the air inlet, which is defined by the vehicle front and which can also be referred to as a recess, may in the vertical vehicle direction have a greater extent than the ventilation flap. In order to nonetheless be able to substantially completely block the air inlet in the closed position, there may be arranged below the ventilation flap a fixed air guiding face which forms a mechanical stop for the ventilation flap in the closed position. The air guiding face may extend substantially in the vertical vehicle direction.

Furthermore, there is provided a vehicle front which has the above-described ventilation flap and the air guiding face and with which the second region of the ventilation flap is in contact in the closed position and which is arranged in the vertical vehicle direction below the ventilation flap in order to thus block an air inlet of the vehicle front.

The vehicle front may further have an actuator which is connected to the rotational axis of the ventilation flap and which is configured to rotate the ventilation flap by means of a rotational movement about the rotational axis from the closed position into the open position.

The vehicle front is a region of the vehicle which is arranged in the longitudinal vehicle direction in front of a drive unit of the vehicle, in particular an engine.

What has been described above with regard to the ventilation flap also applies in a similar manner to the vehicle front and vice versa.

Furthermore, a vehicle having the above-described vehicle front is provided. The vehicle may be a motor vehicle, in particular a passenger vehicle. The vehicle may have a drive unit, wherein the drive unit may have an internal combustion engine, an electric motor and/or a fuel cell.

What has been described above with regard to the ventilation flap and the vehicle front also applies in a similar manner to the vehicle and vice versa.

An embodiment is described below with reference to FIGS. 1 and 2.

DETAILED DESCRIPTION OF THE DRAWINGS

Figure 1:
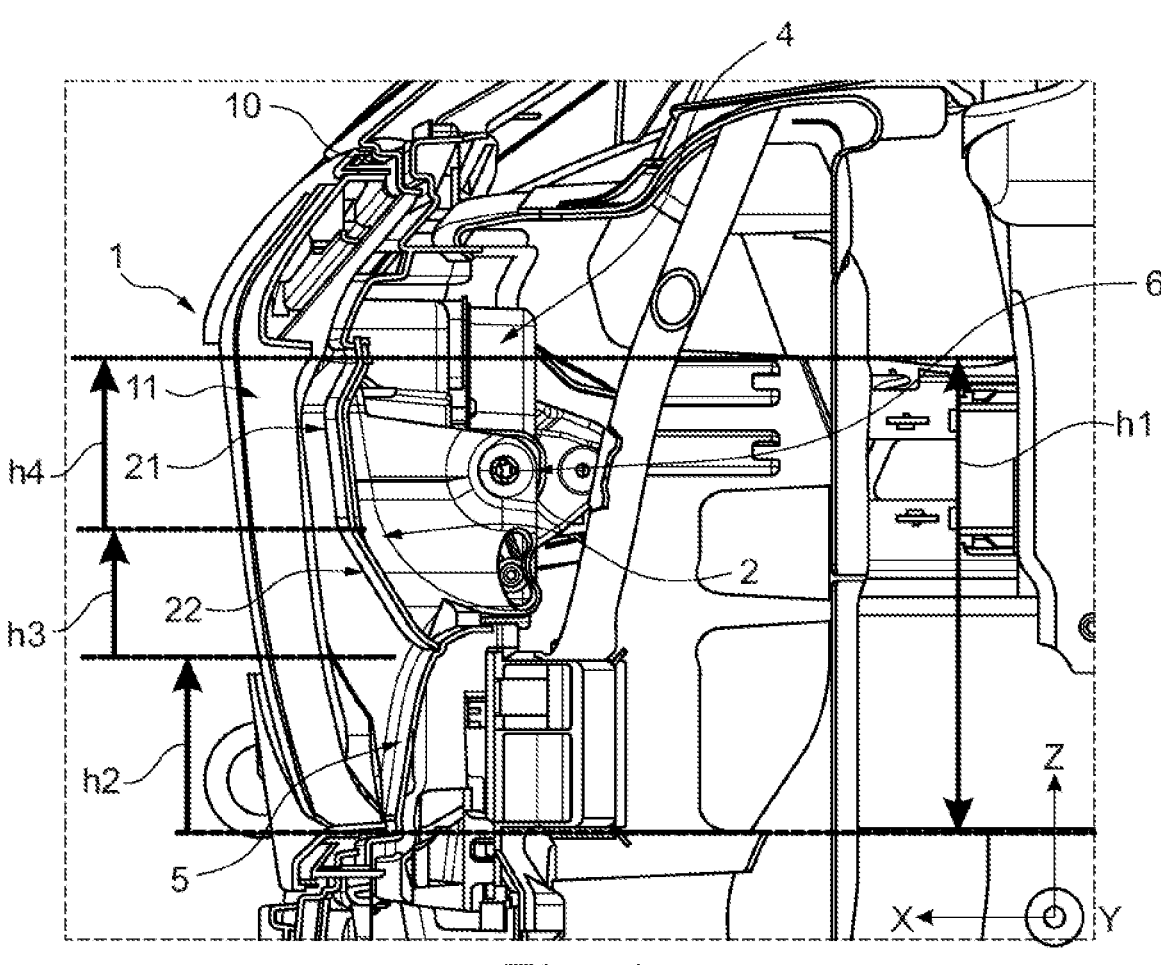
FIG. 1 is a schematic side view of a vehicle front having a ventilation flap.

FIG. 1 shows a vehicle front 1 of a vehicle 10 having a ventilation flap 2 in section through a plane defined by a longitudinal vehicle direction X and a vertical vehicle direction Z when viewed in a vehicle width direction Y. A front side of the ventilation flap 2 is depicted in FIG. 1 with a broken line.

FIG. 1 further shows a Cartesian coordinate system, wherein X indicates the longitudinal vehicle direction, Y indicates the vehicle width direction, and Z indicates the vertical vehicle direction.

The ventilation flap 2 is part of a ventilation flap arrangement of the vehicle front 1 which further comprises an air guiding face 5. It is contemplated that the ventilation flap 2 does not extend over the entire width of an air inlet so that in the vehicle width direction Y at least one additional ventilation flap 2 is arranged beside the ventilation flap 2.

In a closed position, that is to say, in the state illustrated in FIG. 1, the ventilation flap 2 blocks the air inlet of the vehicle front 1, which has a height $h1$, and, in an open position which is not illustrated in FIG. 1, it releases the air inlet.

The ventilation flap 2 is divided in the vertical vehicle direction Z into two mutually adjacent regions 21, 22.

A first upper region 21 which has a height $h4$ in the vertical vehicle direction Z extends in this instance substantially in the vertical vehicle direction Z and a second lower region 22 which has a height $h3$ in the vertical vehicle direction Z extends from the first region in the longitudinal vehicle direction X toward the rear and in the vertical vehicle direction Z in a downward direction.

More specifically, the upper region 21 extends substantially parallel with a grille 11 of the vehicle front 1, which grille is arranged in the longitudinal vehicle direction X in front of the ventilation flap.

The air guiding face 5 which has a height $h2$ is in contact with the second region 22 of the ventilation flap 2 in the closed position and is arranged below the ventilation flap 2 in the vertical vehicle direction Z in order to thus block the air inlet of the vehicle front 1.

A sum of the heights $h2$, $h3$ and $h4$ thus substantially corresponds to the height $h1$ of the air inlet. The heights $h1$, $h2$, $h3$, $h4$ extend in this instance parallel with the vertical vehicle direction Z.

The ventilation flap 2 can be rotated from the closed position into the open position by means of a rotational movement about a rotational axis 6 which extends in the vehicle width direction Y by means of an actuator 4 which can be connected to the rotational axis 6 and which engages in a slotted guiding member in a side face of the ventilation flap 2.

In order to move the ventilation flap 2 from the closed position into the open position, the rotational movement involves, in this instance, a rotation of the ventilation flap 2 about the rotational axis 6 which extends in the vehicle width direction Y in the vertical vehicle direction Z in an upward direction.

During this rotational movement, a collision of the ventilation flap 2 with the grille 11 must be prevented. In order to keep a drag coefficient as minimal as possible, however, an arrangement of the ventilation flap 2 as far forward as possible in the longitudinal vehicle direction X, that is to say, as close as possible to the grille 11, is desirable.

It will be described below with reference to FIG. 2 why the division of the ventilation flap 2 into the above-described two regions 21, 22 is advantageous or suitable for overcoming the described conflict of objectives.

Figure 2:
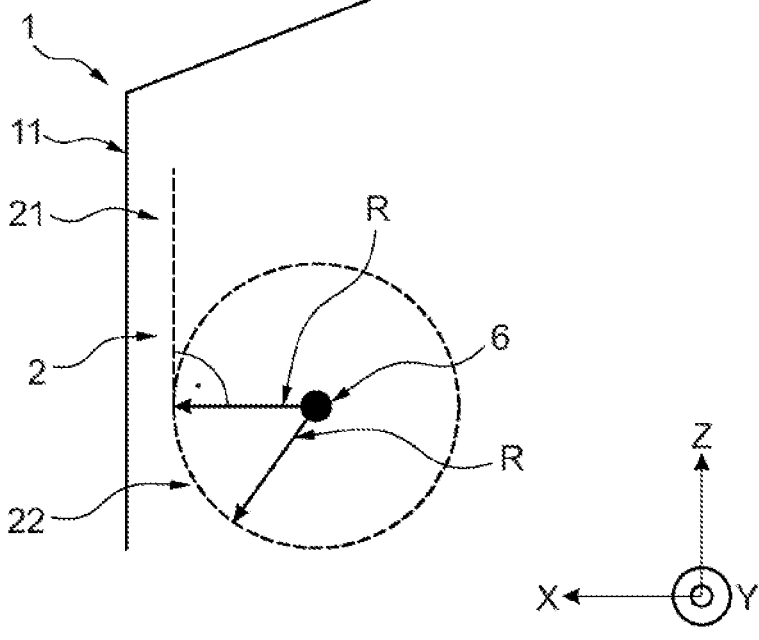
FIG. 2 is a schematic illustration in order to explain a movement path of the ventilation flap during an adjustment from a closed position into an open position.

To this end, FIG. 2 shows a schematic drawing to illustrate a movement path of the ventilation flap 2 as illustrated with continuous lines during an adjustment from the closed position into the open position.

FIG. 2 shows a front side or a contour of the ventilation flap 2 with a broken line.

Furthermore, in FIG. 2, as in FIG. 1, a Cartesian coordinate system is illustrated, wherein X indicates the longitudinal vehicle direction, Y indicates the vehicle width direction and Z indicates the vertical vehicle direction.

A lowest location of the first region 21 of the ventilation flap 2 in the vertical vehicle direction Z is arranged at the same height in the vertical vehicle direction Z as the rotational axis 6. The first region 21 and a horizontal which extends through the rotational axis 6 parallel with the longitudinal vehicle direction X define a right angle as illustrated in FIG. 2.

This means that the upper region 21 forms a tangent to the movement path or the rotation radius R, which is illustrated with a solid line, and this tangent with a straight line which extends through the rotational axis 6 and a contact location of the tangent with the rotation radius R defines a right angle. The rotational axis 6 forms the center of the rotation radius R.

The second region 22 extends from the first region 21 in a curved manner in the longitudinal vehicle direction X toward the rear and in the vertical vehicle direction Z in a downward direction. More specifically, the second region 22 extends from the first region 21 with a radius of curvature R in a curved manner in the longitudinal vehicle direction X toward the rear and in the vertical vehicle direction Y in a downward direction. The radius of curvature R consequently corresponds to the spacing of the lowest location of the first region 21 from the rotational axis 6, as illustrated in FIG. 2.

This spacing R of the lowest location of the first region 21 from the rotational axis 6 corresponds to the radius R of the described circle or a movement path of the second region 22 about the rotational axis 6.

Each location of the second region 22 which moves on this movement path consequently during the rotational movement from the closed position into the open position in the longitudinal vehicle direction X does not exceed the position which the lowest location of the first region 21 has in the closed position in the longitudinal vehicle direction X.

Consequently, a collision of the second region 22 with the grille 11 or another component of the vehicle front 1 which is arranged in the longitudinal vehicle direction X in front of the ventilation flap 2 is excluded. However, the first region 21 can be arranged as close as possible to the grille 11 and consequently at the foremost location of the vehicle front 1.

As described in the introduction, consequently, it is possible for air to flow over in the upper portion or in the first region 21 of the ventilation flap 2 during travel operation. In the lower portion or in the second region 22 of the ventilation flap, an impact location is formed. However, the impact location is always formed at that location, regardless of where the ventilation flap 2 is arranged in this region. It is thereby possible, without any or with only a very small impairment of the drag coefficient, to position the ventilation flap 2 in the lower portion further away from the foremost location of the vehicle front 1 than the ventilation flap 2 in the upper portion.

The illustration which is selected in FIG. 2 as an idealized illustration differs slightly in this instance from the illustration of the ventilation flap from FIG. 1. In FIG. 1, the first region 21 extends slightly further in the vertical vehicle direction Z in a downward direction, that is to say, as far as a location below the position of the rotational axis 6 in the vertical vehicle direction Z.

This portion of the first region 21 which is located in the vertical vehicle direction Z below the rotational axis 6 during the rotational movement from the closed position into the open position in the longitudinal vehicle direction X consequently does not exceed the position which the location of the first region 21 has in the closed position in the longitudinal vehicle direction X, which region is arranged at the same height in the vertical vehicle direction Z as the rotational axis 6.

However, this is possible in the construction illustrated in FIG. 1 because a spacing is selected to be large enough in the longitudinal vehicle direction X from the ventilation flap 2 to the grille 11 for a collision not to take place.

LIST OF REFERENCE NUMERALS

1 Vehicle front
10 Vehicle
11 Grille
2 Ventilation flap
21 Upper region
22 Lower region
4 Actuator
5 Air guiding face
6 Rotational axis
h1 Height of the air inlet
h2 Height of the air guiding face
h3 Height of the lower region
h4 Height of the upper region
R Rotation radius
X Longitudinal vehicle direction
Y Vehicle width direction
Z Vertical vehicle direction

The invention claimed is:

1. A ventilation flap arrangement of a vehicle front, comprising:
a ventilation flap that blocks an air inlet of the vehicle front in a closed position and releases the air inlet in an open position, the ventilation flap being rotatable from the closed position into the open position by a circular rotational movement about a single rotational axis arranged rearwardly behind the ventilation flap in a longitudinal vehicle direction via an actuator, wherein the ventilation flap is divided into two mutually adjacent regions in a vertical vehicle direction,
a first, upper, region of the two regions in the vertical vehicle direction extends substantially in the vertical vehicle direction, and
a second, lower, region of the two regions in the vertical vehicle direction extends from the first region in the longitudinal vehicle direction rearwardly and, in the vertical vehicle direction, downwardly.

2. The ventilation flap arrangement according to claim 1, wherein
the second region extends from the first region in a curved manner rearwardly in the longitudinal vehicle direction and downwardly in the vertical vehicle direction.

3. The ventilation flap arrangement according to claim 1, wherein
the rotational axis extends substantially in a vehicle width direction.

4. The ventilation flap arrangement according to claim 1, wherein
the rotational movement that moves the ventilation flap from the closed position into the open position involves a rotation of the ventilation flap about the rotational axis, which rotational axis extends in a vehicle width direction, upwardly in the vertical vehicle direction.

5. A ventilation flap arrangement of a vehicle front, comprising:
a ventilation flap that blocks an air inlet of the vehicle front in a closed position and releases the air inlet in an open position, the ventilation flap being rotatable from the closed position into the open position by a circular rotational movement about a single rotational axis via an actuator, wherein
the ventilation flap is divided into two mutually adjacent regions in a vertical vehicle direction,
a first, upper, region of the two regions in the vertical vehicle direction extends substantially in the vertical vehicle direction,
a second, lower, region of the two regions in the vertical vehicle direction extends from the first region in a longitudinal vehicle direction rearwardly and, in the vertical vehicle direction, downwardly, and
a lowest location of the first region of the ventilation flap in the vertical vehicle direction is located at a same height in the vertical vehicle direction as the rotational axis so that the first region and a horizontal which extends through the rotational axis parallel with the longitudinal vehicle direction substantially define a right angle.

6. The ventilation flap arrangement according to claim 5, wherein
the second region extends from the first region in a curved manner rearwardly in the longitudinal vehicle direction and downwardly in the vertical vehicle direction.

7. The ventilation flap arrangement according to claim 5, wherein
the second region extends from the first region in a curved manner rearwardly in the longitudinal vehicle direction and downwardly in the vertical vehicle direction with a radius of curvature which corresponds to a spacing of the lowest location of the first region from the rotational axis.

8. A ventilation flap arrangement of a vehicle front, comprising:
a ventilation flap that blocks an air inlet of the vehicle front in a closed position and releases the air inlet in an open position, the ventilation flap being rotatable from the closed position into the open position by a circular rotational movement about a single rotational axis via an actuator, wherein the ventilation flap is divided into two mutually adjacent regions in a vertical vehicle direction, a first, upper, region of the two regions in the vertical vehicle direction extends substantially in the vertical vehicle direction, and a second, lower, region of the two regions in the vertical vehicle direction extends from the first region in a longitudinal vehicle direction rearwardly and, in the vertical vehicle direction, downwardly, in the closed position, the second region of the ventilation flap is in contact with an air guiding face of the vehicle front, which air guiding face is arranged in the vertical vehicle direction below the ventilation flap, the air inlet has a first height (H1), the air guiding face has a second, non-zero, height (H2), the second region of the ventilation flap has a third height (H3), and the first region of the ventilation flap has a fourth height (H4), the first height of the air inlet is greater than a sum of the third and fourth heights of the ventilation flap, and the first height of the air inlet corresponds to a sum of the second, third and fourth heights.

9. A vehicle front, comprising:

a ventilation flap arrangement according to claim 8; and the air guiding face with which the second region of the ventilation flap is in contact in the closed position and which is arranged in the vertical vehicle direction below the ventilation flap in order to block an air inlet of the vehicle front.

10. The vehicle front according to claim 9, further comprising:

the actuator, which actuator is connected to the rotational axis of the ventilation flap and is configured to rotate the ventilation flap about the rotational axis from the closed position into the open position.

11. A vehicle comprising the vehicle front according to claim 9.

* * * * *